Dec. 19, 1950     F. J. NAGEL ET AL     2,534,923
THERMOSET LAMINATED MEMBER
Filed Sept. 9, 1944
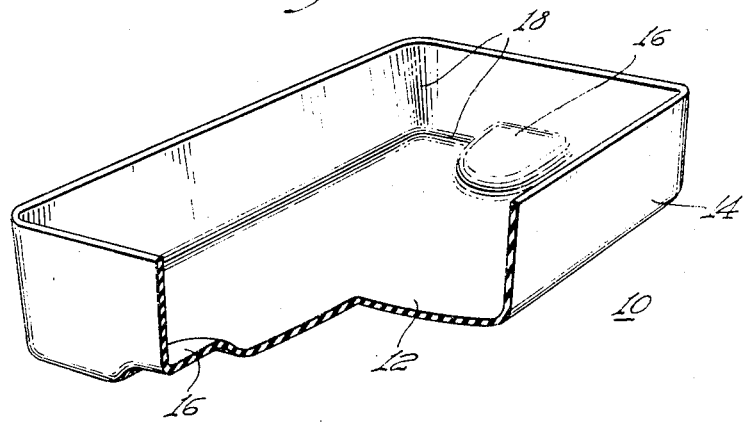
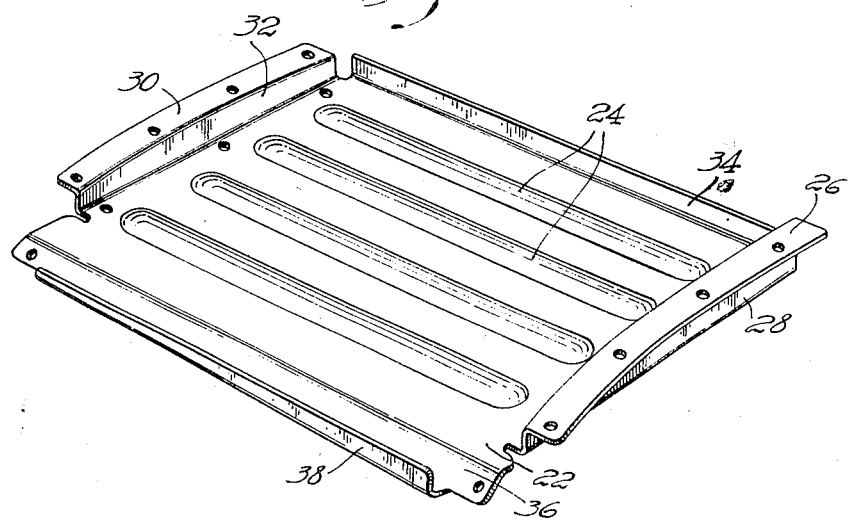
INVENTORS
Fritz J. Nagel and
Bruce C. Nash.

Patented Dec. 19, 1950

UNITED STATES PATENT OFFICE 2,534,923

THERMOSET LAMINATED MEMBER

Fritz J. Nagel, Oakland, and Bruce C. Nash, Wilkinsburg, Pa., assignors to Westinghouse Electric Corporation, East Pittsburgh, Pa., a corporation of Pennsylvania Application September 9, 1944, Serial No. 553,438

7 Claims. (Cl. 154—110)

This invention relates to the preparation of laminated members. In particular, this invention is directed to the preparation of cured laminated members composed of a relatively thermosetting resinous composition applied to sheet fibrous material to provide for reforming of the cured laminated member when heated and at low pressure.

It has been regarded as well established and has been almost universally accepted that thermoset resins, such, for example, as phenol-formaldehyde in the fully cured state, are infusible products that do not soften even if heated to a high temperature. This characteristic was regarded as one of the desirable properties of such thermoset resins as compared to the thermoplastic resins which soften more and more on heating to progressivelly higher temperatures.

Contrary to this conception, it has been discovered that certain resins which may porperly be called thermosetting resins in a fully cured state, can be heated to relatively high temperatures at which they enter a semi-plastic or formable condition. While in this semi-plastic condition, the resins embodied in laminated members can be formed under pressure from simple shapes such as flat sheets into complex three dimensional shapes and if cooled while restrained to the latter shapes will thereafter retain the complex shape. For example, a flat sheet composed of layers of cloth impregnated with and bonded together by the thermoset resin in the fully cured or "C" stage, may be heated to a temperature of about 150° C. to 200° C., and when subjected to a low pressure, the flat sheet may be easily pressed into a cup-like member. When cooled, the cup-like member retains its shape, and the resin again exhibits its relatively thermoset properties at ordinary temperatures of services.

For many commercial purposes, it is highly desirable to produce members of a thermosetting resinous composition in combination with a strengthening or reinforcing filler, particularly desirable fillers being fabrics or sheet fibrous material. In producing shaped members from thermosettable resin and sheet filler, difficulties are encountered in preparing complex shapes, the difficulties increasing markedly with the increasing complexity of the shape.

The manufacturing difficulties involved in directly producing such complex shapes as the cup-like member mentioned above from the original sheets of cloth impregnated with the same resin in the intermediate fusible, or "B" stage, are considerable. It is well known to those skilled in the art that in this latter case the cloth coated with resin in the "B" stage must be cut according to some pattern. In accordance with the shape of the member being produced, the operator must fit and assemble the cut sheets of fabric manually in the mold by placing the sheets one by one according to some predetermined order. Considerable manual skill is often required in this operation. Furthermore, scrap and wastage are considerable since slight errors in disposing the material in the mold may result in improper thickness distribution, flaws, and other defects in the final molded product.

By comparison, by following the present invention the same fibrous material coated with the thermosetting resin described herein in the "B" stage may be easily molded into a flat sheet laminate in the thermoset stage without any particular manufacturing difficulties, and the flat sheet is then simply preheated and may be drawn into a relatively complex shape with ease. No particular manual skill is required. Scrap is greatly reduced and the members so produced are uniformly of high quality. For these reasons, it has been found to be preferable from a manufacturing standpoint to produce initially a simple geometrical shape, such as a flat sheet, of thermoset laminated stock and to reform the laminated sheet under heat and pressure to a complex shape by a postforming operation.

An outstanding advantage of the invention is that a great economy in mold costs may be effected by practicing the postforming process in preparing complex members. The curing to a thermoset state of laminated sheets carrying fusible resin in the "B" stage usually requires high pressures of the order of 1000 pounds per square inch. The steel molds necessary for forming complex shapes directly are costly. According to the present invention, flat sheets may be molded in cheap multiple platen type molds and the reforming to complex shape may be carried out at low pressures in wooden forms or plaster molds or in low melting point metal dies.

It has been discovered that certain phenolic type resinous condensation products have unexpected properties whereby they lend themselves with great advantage to reforming after having been molded into a fully cured, relatively thermoset state in simple geometrical shapes. In particular, it has been discovered that the condensation products of an arylamine-phenol-formaldehyde may be readily postformed to almost any shape under low pressures in inexpensive forming equipment by reheating the thermoset laminated product prepared from them. Further, by suitably combining certain proportions of thermoplastic resinous materials with the arylamine-phenol-formaldehyde condensation product in combination with fibrous sheet material complex members may be produced readily therefrom.

The object of this invention is to provide for preparing fully cured laminated members from a relatively thermoset resinous composition having placticity at elevated temperatures whereby the members may be reformed to a predetermined shape.

A further object of the invention is to provide for combining stretchable fibrous material and an applied cured thermoset resin of predetermined composition into a member of simple geometrical shape that is capable of being postformed.

A still further object of the invention is to provide for combining a thermosetting resin, a thermoplastic resin, and a fibrous material into a laminated member that can be reformed under heat and pressure after curing.

Other objects of the invention will, in part, be obvious and will, in part, appear hereinafter.

For a fuller understanding of the nature and objects of the invention, reference should be made to the drawing in which:

Figure 1 is a view in perspective, partly broken away of a member produced according to the invention; and Fig. 2 is a view in perspective of another member made in accordance with the invention.

The thermosetting resins of this invention that can be subjected to postforming after being fully cured while at an elevated temperature are the reaction products of an arylamine, a phenol, and formaldehyde reacted together in the presence of a basic catalyst. The mols of formaldehyde should equal approximately the sum of the mols of the arylamine and the phenol as will be given in detail herein. The following are examples of typical resins:

Example I

| | Parts |
|---|---|
| Phenol (hydroxy benzene) | 141 |
| Formaldehyde, 37% solution | 320 |
| Hexamethylenetetramine | 30 |
| Aniline | 140 |

In these examples, all parts are by weight. The phenol, formaldehyde and hexamethylenetetramine are admixed in a reaction vessel until they are in solution. Then the aniline is added slowly. Heat is applied until a temperature of about 100° C. has been attained, and the mixture is allowed to reflux for one and one-half hours. The water is removed by subjecting the reaction vessel to a vacuum. After the water is substantially removed, the temperature of the vessel is raised to 125° C. and 250 parts by weight of a solvent composed, for example, of 80% benzene plus 20% methanol, is added thereby producing a resin solution suitable for application to fabrics.

Example II

| | Parts |
|---|---|
| Aniline | 126 |
| m-p Cresol | 174 |
| Paraformaldehyde | 90 |
| Formaldehyde (40% solution) | 135 |
| Ethylenediamine (70% solution) | 6 |

The ingredients are intermixed in a reaction vessel and refluxed at a low temperature (about 100° C.) for 70 minutes, after which the water is removed by applying a vacuum to the reaction vessel. After the water has been removed substantially completely, the temperature of the contents of the vessel is raised to 130° C. for from 15 minutes to 30 minutes. The hot liquid resin may be poured into flat cooling trays. The cooled product is a hard brittle solid which may be ground into a molding powder and used in preparing members. Otherwise a solvent may be applied to the resin to produce a varnish solution.

Example III

| | Parts |
|---|---|
| Cresylic acid | 368 |
| Aniline | 216 |
| Formaldehyde (40% aqueous solution) | 458 |
| Ammonium hydroxide | 20 |

After refluxing the mixture at a temperature below 120° C. for two and one-half hours, the water is removed by applying a vacuum to the reaction vessel. When dehydration is complete, the temperature of the reactants is raised to 125° C. and maintained for a few minutes. Heating is then terminated and upon adding 400 parts of benzene the reaction is completed. A solution of the reaction product in the "A" stage is thus made available for application to various fibrous sheet materials.

Example IV

| | Parts |
|---|---|
| Cresylic acid | 100 |
| Diphenylamine | 80 |
| Formaldehyde (40% solution) | 200 |

The above ingredients were placed in a reaction vessel and three parts by weight of calcium hydroxide is added as a catalyst. The mixture was refluxed for one and one-half hours at a temperature of between 90° C. and 100° C. Thereafter the water present is removed by subjecting the reaction vessel to a vacuum while the resin temperature is from 50° C. to 100° C. The temperature is then raised to 115° C. and terminated by introducing 150 parts by weight of an equal part mixture of benzol and ethanol into the reaction vessel to produce a solution of the resin suitable for application to members.

Example V

| | Parts |
|---|---|
| Diphenylamine | 254 |
| Phenol (hydroxy benzene) | 564 |
| Paraformaldehyde | 150 |
| Formaldehyde (40% aqueous solution) | 335 |
| Ethylene diamine | 1 |

After refluxing the mixture for 40 minutes, the reaction product is dehydrated by applying a vacuum to the reaction vessel and maintaining a temperature of from 58° C. to 100° C. Then 600 parts of benzene are added to make a varnish for application to fibrous material.

In a reaction vessel the following were combined:

Example VI

| | Parts |
|---|---|
| Cresylic acid | 333 |
| Aniline | 83 |
| Diphenylamine | 20 |
| Paraformaldehyde | 90 |
| Formaldehyde (40% aqueous solution) | 150 |
| Ethylene diamine (70% aqueous solution) | 3.5 |

Heat was applied and the vessel contents were refluxed for one and one-half hours, then the water was removed by applying a vacuum to the reaction vessel. The temperature was increased slowly until a temperature of 110° C. was attained and then 400 parts by weight of benzene was added to terminate the reaction and to prepare an impregnating varnish.

In Example VI, the aniline may vary from 10% to 100% of the weight of the phenol, while the diphenylamine may vary from 3% to 110% of the weight of the phenol.

In the above examples, other arylamines may be employed with satisfactory results. The ortho, meta, and para toluidines, naphthylamines, metaphenylene diamine, and other aryl diamines may be substituted for a part or all of the aniline or diphenylamine. In general, the arylamines suitable for the practice of this invention are the simple substituted phenyl or naphthyl, primary or secondary, mono- and diamines. The proportion of the arylamine for the purpose of this invention may vary from 35% to 75% of the total weight of the phenol plus arylamine. In general, the minimum amount of arylamine is 20% of the weight of the phenol. Excellent results have been obtained with practice when the amount of the arylamine is from about 80% to 90% of the weight of the phenol.

The phenols suitable for practice of the invention are hydroxy benzene, meta-cresol, meta, para-cresol, cresylic acid and xylenols. Hydroxy benzene has given excellent results in many cases.

It has been found that formaldehyde either in aqueous solution or as the simple polymer paraformaldehyde or in combination with ammonia as hexamethylenetetramine, may be employed in the manufacture of the resin with good results. The proportion of the formaldehyde may vary from 0.8 mol to 1.5 mols for the total mols of phenol and arylamine combined. Best results are secured when the mol ratio of formaldehyde is 1.1 to the total mols of phenol and arylamine. The term "formaldehyde" which is employed in the specification and claims is intended to cover formaldehyde and its polymers.

The reaction of the arylamine, phenol, and formaldehyde is preferably carried out with a basic catalyst. Suitable catalysts are ammonia, both as aqueous solutions and as hexamethylenetetramine, diamines, for example, ethylene-diamine, and the alkaline metal and the alkaline earth metal oxides and hydroxides, such, for example, as lime.

The solvents for the reaction product in the "A" stage produced in the reaction vessel may be the conventional solvents, such, for example, as alcohol, motor benzol (a petroleum fraction), benzene, or mixtures thereof. Solutions having 30% to 80% solid content of resin have been found suitable for use in practicing the invention.

The fibrous material to which arylamine-phenol-formaldehyde resin is applied should be characterized by good stretching properties without rupture. Losely woven or knitted fabrics have been employed with satisfactory results. Cotton duck and cotton drill are examples of fabrics usable for the purpose of the invention. In some cases fabrics prepared from thermoplastic resinous fibrous materials, such, for example, as rayon, superpolyamides, and vinylidene chloride may be employed in combination with cellulosic fibers or alone, and the resin applied thereto.

The fibrous sheet material may be treated with the solution of arylamine-phenol-formaldehyde resin such, for instance, those of Examples I to VI, and heat-treated to remove the solvent. Sufficient solid resin should be applied to the cloth to increase the weight of the cloth at least 50%. For best results the amount of applied resin should be equal to from 75% to 150% of the weight of the cloth. Both greater and lesser quantities of resin may be applied to fibrous sheet material if it is desired though the degree of formability may be impaired.

The following is one example of the preparation of a suitable laminated member:

Example VII

A 6.5 ounce unbleached cotton drill was treated with a 60% solid solution of an aniline-phenol-formaldehyde reaction product wherein the aniline was 42% of the weight of the phenol and aniline combined. The cloth was dipped several times and dried between dips until the resin ratio was 1.85; that is, the resin equalled 85% of the weight of the cotton drill. The greenness of the treated fabric was from 2% to 5% after drying (that is, 2% to 5% of the resin exuded when heated at 150° C. and subjected to a pressure of 1000 pounds per square inch). A plurality of layers of cloth were superimposed, and pressed at 1000 pounds per square inch at a temperature of 160° C. A flat sheet member of about $\frac{1}{16}$ inch thickness was produced and was then placed between heated flat platens until its temperature was raised to 175° C.

The heated flat sheet was transferred to a mold and pressed into the rectangular box 10 approximately four inches by six inches shown in Figure 1 of the drawing. The box 10 has a slightly dished bottom 12 and side walls 14 about an inch in height. Two bosses 16 approximately three-eighths of an inch above the bottom 12 were formed at the ends of the box. The various corners 18 had a radius of approximately one-quarter of an inch, though the radii at the boss were less than this value at some points. No breaks or cracks were present in the box 10.

In molding the box 10 and other members it was found that wood, plaster or low melting point metal dies and molds can be used. Pressures of from a few pounds per square inch to 100 pounds per square inch are sufficient to form almost any shaped member from sheets of laminate. Pressure is applied to the laminate for a minute or more until it has cooled to about 100° C. or less and the formed member may be removed from the mold without losing the shape so imparted.

Example VIII

A 20% vinyl-acetate solution of an intermediate molecular weight was applied to unbleached cotton drill to produce thereon a coating equal to one-tenth of the weight of the cotton drill. Thereafter a 42% aniline-phenol-formaldehyde resin was applied to a total resin content of 1.85; that is, the vinyl acetate and the aniline-phenol-formaldehyde resin weighed 85% of the weight of the cloth. Using this impregnated cloth, laminated flat sheets were molded to 150° C. at 1500 lbs. per square inch. The flat sheets were heated under infra-red lamps to about 200° C. and then pressed into complex three dimensional shapes. The complex members produced had the following physical properties:

Tensile strength _____ p. s. i __ 13,400
Impact strength _____ ft. lbs./inch __ 4.4
Compressive strength _____ p. s. i __ 41,500
Bond strength _____ lbs __ 1,550
Moisture absorption (ASTM) 1/16" mtl.
   24 hr. value _____ per cent __ 3

Example IX

A solution of 15% hydrolyzed polyvinyl acetate was applied to 6.5 ounce unbleached cotton drill in an amount equal to 20% of the weight of the cloth. Following this, the coated cloth was treated with a diphenylaminephenol formaldehyde resin solution, such as that of Example V, to apply thereto sufficient resin giving a total resin weight on the cloth equal to the weight of the original cloth. A plurality of laminations were superimposed and molded into flat sheets under a pressure of 1500 p. s. i. at a temperature of 160° C. The members were moldable after preheating below the blistering point into numerous aircraft parts such as wing tips, aileron tabs, fairings and other members in which the flat sheets were subjected to reforming into complex shapes. The sheets were preheated to a temperature of about 200° C. at which temperature they were easily reformed into required three-dimensional shapes.

Referring to Figure 2 of the drawing, there is illustrated a complex shaped post-formed member 20 prepared from the laminated sheets described herein. The member 20 is approximately 33 inches by 20.5 inches overall. It is employed as a guard member in aircraft. The guard member 20 is prepared from a flat sheet of cloth laminate 0.060 inch thick which is blanked in a press to cut out the corners. The blanked laminate is suspended between a battery of heating lamps for about 30 seconds until a temperature of about 175° C. is reached. A wood mold operated by air pistons is applied to the heated blank and pressed for approximately one minute. The formed guard member can be left in the mold a little longer to cool or it can be removed and water applied to cool it for use.

As illustrated the guard member 20 has a relatively flat bottom 22 provided with four indented ribs 24 one-quarter inch deep by two inches wide to stiffen the bottom 22. The curved flange 26 is about two inches above the bottom 22 at its farthest point at the side 28. The other end flange 30 is less curved and is only a maximum of seven-eighths of an inch above the bottom 22 at the side 32. The side 34 is turned up from the bottom 22 with a radius of approximately one-eighth of an inch. The other side comprises a portion 36 downwardly turned at an obtuse angle to the bottom 22, the portion 36 varying from one-half inch to one and five-eighths inches. The lip 38 tapering from one end to the other three-sixteenths of an inch to the portion 36. It will be obvious that the guard member is characterized by such complex curves and radii that its manufacture by the simple process indicated is an achievement in the art of resinous laminates.

The heating of the flat sheets of laminate may be accomplished by subjecting the sheets to infra-red lamps, or by placing them between heated platens or subjecting them to a high frequency field. Other modes of heating may be employed.

In preparing cured laminates embodying the post-formable thermoset resins of this invention, a plurality of layers of the sheet fibrous material impregnated with the resin in the "B" stage are placed in a flat platen or other simple shaped mold and cured into a flat sheet or a simple curved sheet in which the fibers of the fibrous material are not under any appreciable tension. When subjected to postforming operations the fibrous material is stretched. Woven fabrics will show extensive stretching at sharp corners and at deep draws. The distortion of the weaving pattern will give evidence of this stretching.

The term "complex shaped" is intended to particularly denote a three-dimensional surface.

While the invention is particularly described by reference to substantially flat sheets, it will be appreciated that members of non-uniform size and thickness and moderately curved form can be initially prepared and postformed by applying heat and pressure thereto.

In order to improve the postforming characteristics of laminated members prepared from the arylamine-phenol-formaldehyde resin of this invention, thermoplastic resinous polymers may be admixed therein up to an amount of about 30% of the total weight. Suitable thermoplastic resinous polymers are the polyvinyl acetates, polyvinyl butyrates, polyvinyl acetate butyrates and similar low acidity polyvinyl polymers, and polyvinyl acetals, such as polyvinyl butyrals, polyvinyl formals, and the like. Cellulose ethers, such as, for example, ethyl cellulose, have been employed with success.

The thermoplastic resinous polymers listed above have been applied to the fabric as an initial coating previous to applying the arylamine-phenol-formaldehyde resin with good results. Example VIII above is typical of this practice. Approximately 25% of the weight of the fabric is the maximum amount of thermoplastic that may be applied without impairing the postforming properties of the product and its properties at room temperature.

The thermoplastic resinous polymer to be employed in the practice of the invention is preferably selected from thermoplastic resinous compounds that are basic or neutral, or at most only weakly acid in nature. Strongly acid thermoplastic resins, such for example, as vinyl chloride may accelerate the hardening of arylamine-phenol-formaldehyde resin to such an extent that the operation of preparing members may be greatly impaired. Likewise decomposition or depolymerization may take place with adverse results. It has been found that the requirements of compatibility of the thermoplastic vinyl resin with the arylamine-phenol-formaldehyde resin limit the proportion of thermoplastic resin to about 30% of the total weight of the resins. Further, the polyvinyl resins and the cellulose ethers are sufficiently compatible with the thermosetting resin to provide satisfactory laminated products.

In some cases, small amounts of plasticizers, such, for example, as diamyl phthalate, dioctyl phthalate, tricresyl phosphate, or glycolates, may be added to improve the flexibility and moldability of the final product.

Since certain changes in carrying out the above process may be made without departing from the scope thereof, it is intended that all matter contained in the above description shall be interpreted as illustrative and not in a limiting sense.

We claim as our invention:

1. A relatively thermoset laminated member capable of being reformed under a predetermined temperature and pressure composed of a stretchable fibrous fabric and a relatively thermoset resin in an amount of at least half the weight of the fabric applied thereto, the resin composed of a non-halogenated, low acidity thermoplastic resinous polymer up to 30% of the total weight of the resin the thermoplastic polymer being present as an initial coating on the fabric, and the balance being applied over the thermoplastic polymer and comprising essentially the reaction product of a phenol, an arylamine in an amount of from 20% to 125% of the weight of the phenol and formaldehyde in an amount of from 0.8 to 1.5 mols for each mol of phenol and arylamine combined, the reaction being catalyzed with a basic catalyst.

2. A relatively thermoset laminated member capable of being reformed under a predetermined temperature and pressure composed of a stretchable fibrous cellulosic fabric and a relatively thermoset resin in an amount of at least half the weight of the fabric applied thereto, the resin composed of a non-halogenated, low acidity thermoplastic polyvinyl resin in an amount of up to 30% of the total weight of the resin, the thermoplastic polymer being present as an initial coating on the fabric, and the balance being applied over the thermoplastic polymer and comprising essentially the reaction product of a phenol, an arylamine in an amount of from 20% to 125% of the weight of the phenol and formaldehyde in an amount of from 0.8 to 1.5 mols for each mol of phenol and arylamine combined, the reaction being catalyzed with a basic catalyst.

3. A relatively thermoset laminated member capable of being reformed under a predetermined temperature and pressure composed of a stretchable fibrous cellulosic fabric and a relatively thermoset resin in an amount of at least half the weight of the fabric applied thereto, the resin composed of a thermoplastic cellulose ether in an amount of up to 30% of the total weight of the resin, the thermoplastic polymer being present as an initial coating on the fabric, and the balance being applied over the thermoplastic polymer and comprising essentially the reaction product of a phenol, an arylamine in an amount of at least 20% of the weight of the phenol, and formaldehyde in an amount of from 0.8 to 1.5 mols for each mol of phenol and arylamine combined, the reaction being catalyzed with a basic catalyst.

4. A relatively thermoset laminated member capable of being reformed under a predetermined temperature and pressure composed of a stretchable fibrous cellulosic fabric and a relatively thermoset resin in an amount of at least half the weight of the fabric applied thereto, the resin composed of a non-halogenated, low acidity thermoplastic polyvinyl resin in an amount of up to 30% of the total weight of the resin the thermoplastic polymer being present as an initial coating on the fabric, and the balance being applied over the thermoplastic polymer and comprising essentially the reaction product of a phenol, an aniline in an amount of from 20% to 125% of the weight of the phenol and formaldehyde in an amount of from 0.8 to 1.5 mols for each mol of phenol and aniline combined, the reaction being catalyzed with a basic catalyst.

5. In the process of producing complex shaped members, the steps comprising applying to a fibrous sheet material at least 50% of its weight of the partial reaction product of from 35 to 75 parts by weight of an arylamine, 65 to 25 parts by weight of a phenol and from 0.8 to 1.5 mols of formaldehyde for each mol of phenol and arylamine, superimposing a plurality of the fibrous sheets with the applied partial reaction product, consolidating the superimposed sheets under heat and pressure of the order of 1000 pounds per square inch into a relatively flat fully cured, thermoset laminate, relieving the pressure and cooling the flat laminate, subsequently heating the laminate to a temperature of from 150° C. to 200 C. and subjecting the laminate to pressure of less than 100 pounds per square inch to form it into the predetermined complex shaped member and cooling the member to retain the shape.

6. In the process of producing complex shaped members, the steps comprising applying to a fibrous sheet material an initial coating of a non-halogenated, low acidity thermoplastic resin in an amount of up to 30% of the weight of the sheet material, then applying a coating of at least 50% of the weight of the sheet material of the partial reaction product of from 35 to 75 parts by weight of aniline, 65 to 25 parts by weight of a phenol and from 0.8 to 1.5 mol of formaldehyde for each mol of phenol and aniline, superimposing a plurality of the fibrous sheets with the applied partial reaction product, consolidating the superimposed sheets under heat and a pressure of the order of 1000 pounds per square inch into a relatively flat, fully cured, thermoset laminate, subsequently heating the laminate to a temperature of from 150° C. to 200° C. and subjecting the laminate to pressure of less than 100 pounds per square inch to form it into the predetermined complex shaped member.

7. In the process of producing complex shaped members, the steps comprising applying to a fibrous sheet material an initial coating of a non-halogenated, low acidity thermoplastic vinyl resin in an amount of up to 30% of the weight of the sheet material, then applying a coating of from 75% to 150% of the weight of sheet material of the partial reaction product of from 35 to 75 parts by weight of an arylamine, 65 to 25 parts by weight of a phenol and from 0.8 to 1.5 mol of formaldehyde for each mol of phenol and arylamine, superimposing a plurality of the fibrous sheets with the applied partial reaction product, consolidating the superimposed sheets under heat and a pressure of the order of 1000 pounds per square inch into a relatively flat, fully cured, thermoset laminate, subsequently heating the laminate to a temperature of from 150° C. to 200° C. and subjecting the laminate to pressure of less than 100 pounds per square inch to form it into the predetermined complex shaped member.

FRITZ J. NAGEL.
BRUCE C. NASH.

REFERENCES CITED

The following references are of record in the file of this patent:

UNITED STATES PATENTS

| Number | Name | Date |
|---|---|---|
| 1,133,083 | Baekeland | Mar. 23, 1915 |
| 1,284,296 | Frederick | Nov. 12, 1918 |
| 1,469,220 | Kemp | Oct. 2, 1923 |
| 1,475,623 | Egerton | Nov. 27, 1923 |
| 1,559,846 | Brown | Nov. 3, 1925 |
| 1,873,799 | Vacher | Aug. 23, 1932 |
| 1,955,731 | Bender | Apr. 24, 1934 |
| 1,994,753 | Cherry | Mar. 19, 1935 |
| 2,137,568 | Cserny | Nov. 22, 1938 |
| 2,401,138 | Coes | May 28, 1946 |
| 2,482,499 | Nagel | Sept. 20, 1949 |

FOREIGN PATENTS

| Number | Country | Date |
|---|---|---|
| 120,874 | Austria | Jan. 26, 1931 |
| 371,344 | Great Britain | Apr. 18, 1932 |
| 555,669 | Great Britain | Sept. 2, 1943 |

OTHER REFERENCES

"Laminating" by J. D. Nelson, published in General Electric Review on September 1943, pages 483–487.

Morrell: "Synthetic Resins and Allied Plastics," second edition, 1943, page 9.